United States Patent [19]
Tabuchi et al.

[11] Patent Number: 5,311,492
[45] Date of Patent: May 10, 1994

[54] RECORDING/REPRODUCING APPARATUS FOR RECORDING STARTING IDENTIFICATION INFORMATION PRIOR TO A RECORDING START POSITION

[75] Inventors: Yoichi Tabuchi; Yoshiaki Shinke; Sakae Tachikawa; Hitoshi Moori, all of Higashihiroshima, Japan

[73] Assignee: Sharp Kabushiki Kaisha, Osaka, Japan

[21] Appl. No.: 871,764

[22] Filed: Apr. 21, 1992

[30] Foreign Application Priority Data

Apr. 30, 1991 [JP] Japan .................. 3-098613

[51] Int. Cl.[5] .......................... G11B 15/20
[52] U.S. Cl. ...................... 369/47; 369/84; 369/54; 369/83; 360/72.1; 360/72.2; 360/15
[58] Field of Search ........ 369/84, 85, 47, 54, 369/83; 360/72.1, 72.2, 15, 78.02, 78.04, 78.11, 78.14

[56] References Cited

U.S. PATENT DOCUMENTS

| | | | |
|---|---|---|---|
| 4,641,208 | 2/1987 | Inazawa et al. | 360/72.2 |
| 4,821,128 | 4/1989 | Inazawa et al. | 360/72.2 |
| 4,831,467 | 5/1989 | Asano | 360/72.2 |
| 4,962,435 | 10/1990 | Furuta | 360/72.2 |
| 4,992,892 | 2/1991 | Yamada et al. | 360/32 |
| 5,121,269 | 6/1992 | Tsuchida et al. | 360/72.2 |

FOREIGN PATENT DOCUMENTS

| | | |
|---|---|---|
| 63-70973 | 3/1988 | Japan . |
| 63-228472 | 9/1988 | Japan . |
| 1-251361 | 10/1989 | Japan . |
| 2-66790 | 3/1990 | Japan . |
| 2-302979 | 12/1990 | Japan . |

OTHER PUBLICATIONS

"Digital Audio Tape Deck" Operating Instructions for DTC-75ES, by Sony Corporation, 1990.

*Primary Examiner*—W. R. Young
*Assistant Examiner*—P. W. Huber
*Attorney, Agent, or Firm*—Nixon & Vanderhye

[57] ABSTRACT

When dubbing information from a first recording medium to a second recording medium, control information including a start ID is recorded at appropriate timing. For example, when the fourth music selection recorded on a CD is reproduced for recording on a magnetic tape, the reproducing operation is started at a position (4, 00, 36) (represented by data TNC, INDEX, and FRAME) preceding the start position (4, 01, 46) of the fourth music. When a position (4, 00, 40) is detected, a record directing signal for directing the recording of the start ID is output to a digital magnetic tape recorder selection. This ensures the recording of the start ID prior to the recording on the magnetic tape of the start position of the fourth music selection.

10 Claims, 9 Drawing Sheets

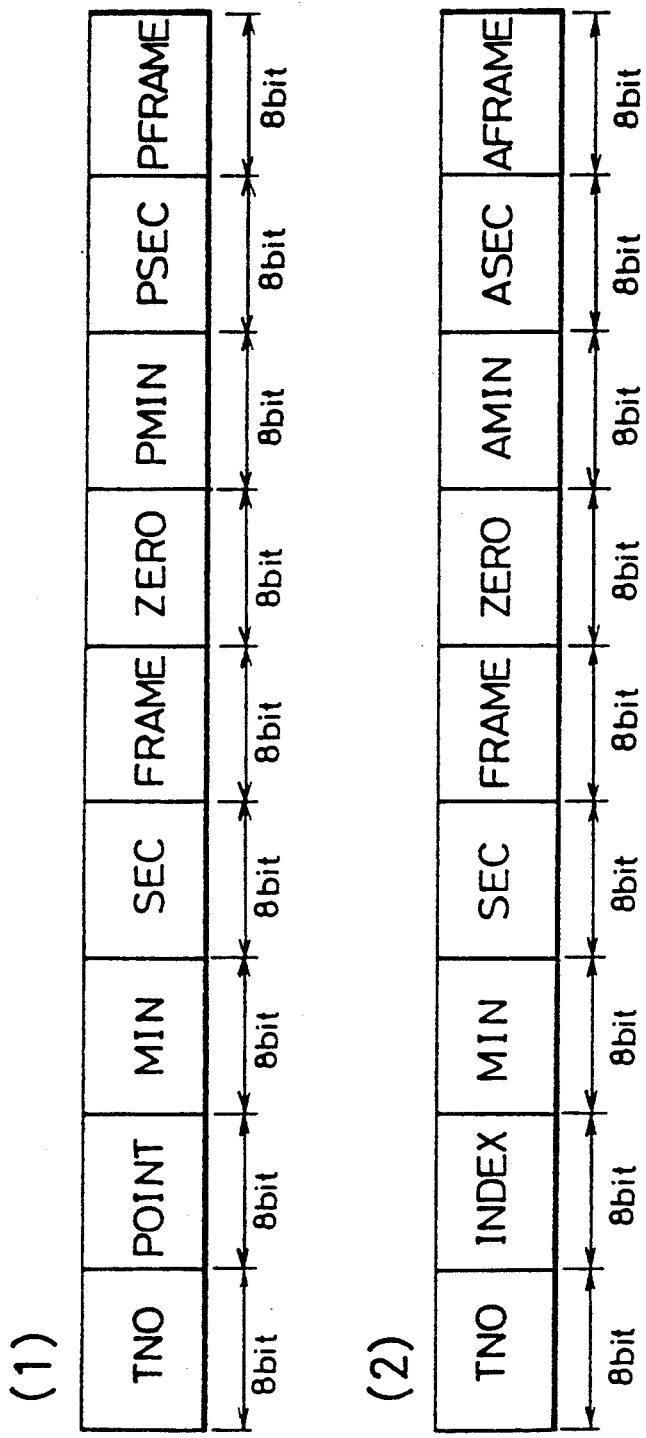

RECORDING/REPRODUCING APPARATUS FOR RECORDING STARTING IDENTIFICATION INFORMATION PRIOR TO A RECORDING START POSITION

BACKGROUND OF THE INVENTION

1. Field of the Invention

The present invention relates to a recording/reproducing apparatus for reproducing information from a first recording medium such as a compact disc (hereinafter abbreviated as CD), on which main information such as music information and control (subcode) information such as music number and time information are recorded, and for recording the main information on a second recording medium, such as a magnetic tape, along with subcode information such as a program start signal.

2. Description of the Related Art

Dubbing apparatus for recording (dubbing) information such as music signals prerecorded on a CD or the like onto a magnetic tape are disclosed in Japanese Patent Unexamined Publication Nos.JP-A 63-70973 (1988) and JP-A 1-251361 (1989). One such dubbing apparatus comprises, as shown in FIG. 1, a CD player section 31 and a digital magnetic tape recorder section 32 interconnected via a terminal 33.

In the CD player section 31, a signal detected by an optical pickup 34 is amplified by an RF amplifier, 35 and is fed to a signal processing circuit 36 to extract a digital signal such as an audio signal. In some apparatus, the digital signal from the signal processing circuit 36 is directly output from the CD player section 31, but in most apparatus, the digital signal is converted to an analog signal by a D/A converter 37 for output at the terminal 33 so that the signal can also be supplied to an audio output terminal (not shown).

In the digital magnetic tape recorder section 32, the analog signal transferred through the terminal 33 is converted by an A/D converter 38 into a digital signal which is then fed to a signal processing circuit 39 where such processing as modulation and the addition of subcode information, etc. is performed. The signal from the signal processing circuit 39 is amplified by an amplifier 40 for recording on a magnetic tape (not shown) by means of a magnetic head 41.

In the thus constructed dubbing apparatus, in order to record a start ID automatically, a level sensor 42 is used to detect the level of the analog audio signal supplied from the CD player section 31. For example, when the sound level lower than −60dB continues, for example, for 3 seconds or more (this level somewhat varies from one apparatus to another but is set to practically optimum level), the level sensor 42 determines that it is an intermusic space, and when a signal is detected after that, the level sensor 42 determines that it is the beginning of music, and provides a detection signal to the signal processing circuit 39. The signal processing circuit 39 performs control so that the start ID is recorded on the magnetic tape in response to the detection signal supplied from the level sensor 42.

In the dubbing apparatus shown in FIG.2, the signal processing circuit 36 in the CD player section 31 is so configured that the CD subcode information is provided to a terminal 44. To this terminal 44 is connected a beginning-of-music detector 43 in the digital magnetic tape recorder section 32. Based on the subcode information, the beginning-of-music detector 43 detects the position where the music number changes or where the music playing time becomes zero, determines such detected position as the beginning of music, and provides a detection signal to the signal processing circuit 39. The signal processing circuit 39 performs control so that the start ID is recorded on the magnetic tape in response to the detection signal supplied from the beginning-of-music detector 43.

In the dubbing apparatus of FIG.1, a change in the audio signal level is detected during producing of a CD by the CD player section 31, and after determining the change as the beginning of music, the signal processing circuit 39 outputs a start ID control signal for recording of the start ID. Therefore, the signal processing circuit 39 must perform arithmetic processing between the time the change is detected and the time the start ID is recorded, which causes a delay in the timing of recording the start ID. In other words, the start ID is recorded at a position past the correct music beginning position, the resulting problem being that a dropout of sound occurs in the beginning of music when reproducing the music by using the start ID.

The dubbing apparatus of FIG.2 has a similar problem to that of the foregoing apparatus of FIG.1. It has the further problem that the subcode information recorded on the CD cannot be utilized effectively.

SUMMARY OF THE INVENTION

It is an object of the invention to provide a recording/reproducing apparatus wherein plural pieces of main information prerecorded on a first recording medium are reproduced for recording on a second recording medium, the apparatus also being capable of recording a control signal designating the recording start position of each main information and having the ability of accurately controlling the apparatus by effectively utilizing the control information prerecorded on the first recording medium.

The invention provides a reproducing apparatus having reproducing means for reproducing information from a first recording medium and providing the reproduced information to a recording apparatus, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, the reproducing apparatus comprising:

setting means which, based on the address information designating the recording start position of the main information to be recorded, sets a prescribed position before the recording start position as an output position of a record directing signal for directing the recording apparatus to record the start position identifying information pertaining to the main information; and control signal output means which, based on the address information, outputs the record directing signal when the preset record directing signal output position is detected during reproduction.

The invention also provides a reproducing apparatus having reproducing means for providing information from a first recording medium and providing the reproduced information to a recording apparatus, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, the reproducing apparatus comprising:

setting means which, based on the address information pertaining to the main information to be reproduced, sets prescribed positions before the recording start position as output positions of a plurality of control signals for controlling the operations of the reproducing and the recording apparatus; and control signal output means which, based on the address information, outputs the corresponding control signal when each of the control signal output positions is detected.

The invention further provides a recording apparatus having recording means for recording an output signal from a reproducing apparatus reproducing a first recording medium onto a second recording medium, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, the recording apparatus comprising:

control signal detection means for detecting a record directing signal for directing the recording of start position identifying information pertaining to the main information or for detecting a plurality of control signals for controlling the operation of the recording means;

control information recording means for recording the start position identifying information on the second recording medium in response to an output from the control signal detection means; or recording control means for controlling the recording operation in response to an output from the control signal detection means and in accordance with the detected control signal.

The invention further provides a recording/reproducing apparatus having reproducing means for reproducing information from a first recording medium and recording means for recording an output signal from the reproducing means onto a second recording medium, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, wherein the reproducing means comprising:

setting means which, based on the address information pertaining to the main information to be reproduced, sets a prescribed position before the recording start position as an output position of a muting off signal for muting off the recording means and a prescribed position after the recording end position as an output position of a muting signal for muting on the recording means; and control signal output means which, based on the address information, outputs the muting off or on the muting on signal when the muting off signal or the muting on signal output position is detected during reproduction, and the recording means comprising:

control signal detection means for detecting the muting off and the muting on signal; and recording control means for controlling the muting operation of the recording means in response to the control signal detection means.

The invention further provides a recording/reproducing apparatus having reproducing means for reproducing information from a first recording medium and recording means for recording an output signal from the reproducing means onto a second recording medium, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, the recording/reproducing apparatus comprising:

control means for setting the main information to be reproduced and controlling the reproduction thereof;

control signal output means which, based on control information supplied to the control means, outputs a plurality of control signals for controlling the operations of the reproducing and the recording means:

selecting means for selecting the operation mode of the reproducing and the recording means;

display means for displaying the operating states: and, display control means for controlling the display means in accordance with the control signals and the selected operation mode.

The invention further provides a recording/reproducing apparatus having reproducing means for reproducing information from a first recording medium and recording means for recording an output signal from the reproducing means onto a second recording medium, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, wherein the reproducing means comprising reproduction display means for displaying reproducing states and the recording means comprising record display means for displaying recording states, the reproducing display by the reproduction display means being synchronized with the record display by the record display means.

The invention further provides a recording/reproducing apparatus having reproducing means for reproducing information from a first recording medium and recording means for recording an output signal from the reproducing means onto a second recording medium, the first recording medium holding plural pieces of main information prerecorded in a predetermined sequence, control information including at least address information designating the recording start position of each main information being prerecorded thereon in an area preceding the plural pieces of main information while in an area where main information is recorded, having address information prerecorded identifying the area, wherein the reproducing means comprising:

setting means which, based on the address information designating the recording start position of the main information to be reproduced, sets a prescribed position before the recording start position as an output position of a record directing signal for directing the recording means to record the start position identifying information and also sets output positions of a plurality of control signals for controlling the operations of the reproducing and recording means; and control signal output means which, based on the address information, outputs the record directing signal when the preset record directing signal output position is detected during reproduction, and outputs the corresponding control signal when each of the preset control signal output positions is detected during reproduction, and the recording means comprising;

control signal detecting means which detects the record directing signal for directing the recording of the start position identifying information pertaining to the main information and also detects the plurality of control signals for controlling the operation of the recording means;

control information recording means for recording the start position identifying information on a recording medium, in response to an output from the control signal detecting means; and recording control means for controlling the recording operation in response to an output from the control signal detecting means and in accordance with the detected control signal.

According to the invention, when reproducing the main information from the first recording medium for recording onto the second recording medium, the start position identifying information pertaining to the main information and to be recorded on the second recording medium is output before reproducing the start position of the main information on the first recording medium, so that the start position identifying information is recorded at a position before the recording start position of the main information the second recording medium.

Also, according to the invention, the operations of the reproducing and the recording means can be controlled based on the control information. For example, when reproducing the main information from the first recording medium for recording onto the second recording medium, reproduction can be started from a read start position preceding the start position of the main information on the first recording medium while at the same time, starting the recording operation.

Furthermore, according to the invention, when reproducing the main information from the first recording medium for recording onto the second recording medium, muting is effected at least during the period that recording of the main information is not being performed.

Moreover, according to the invention, the respective display means indicate whether the reproducing means is in reproducing operation and whether the recording means is in recording operation.

As described above, according to the invention, when reproducing the main information from the first recording medium for recording onto the second recording medium, the start position identifying information pertaining to the main information and to be recorded on the second recording medium is output before reproducing the start position of the main information on the first recording medium, so that the start position identifying information is recorded at a position before the recording start position of the main information on the second recording medium. This ensures the recording of the start position identifying information prior to the recording of the main information and thereby prevents malfunctioning and occurrence of a dropout in the beginning part of the main information during reproduction by using the start position identifying information.

Also, according to the invention, when reproducing the main information from the first recording medium for recording onto the second recording medium, for example, reproduction can be started from a read start position preceding the start position of the main information on the first recording medium while at the same time, starting the recording operation; this prevents a dropout from occurring in the beginning part of the main information.

Furthermore, according to the invention, when reproducing the main information from the first recording medium for recording onto the second recording medium, muting is effected at least during the period that recording of the main information is not being performed; this prevents unwanted information from being recorded between one main information and the next.

Moreover, according to the invention, the respective display means indicate whether the reproducing means is in reproducing operation and whether the recording means is in recording operation, so that the operator of the recording apparatus can visually check the operation mode of the recording/reproducing apparatus with ease.

BRIEF DESCRIPTION OF THE DRAWINGS

Other and further objects, features, and advantages of the invention will be more explicit from the following detailed description taken with reference to the drawings wherein:

FIG.4 is a diagram showing Q channel data formats of a CD 3;

DETAILED DESCRIPTION OF THE PREFERRED EMBODIMENTS

Figure 1:
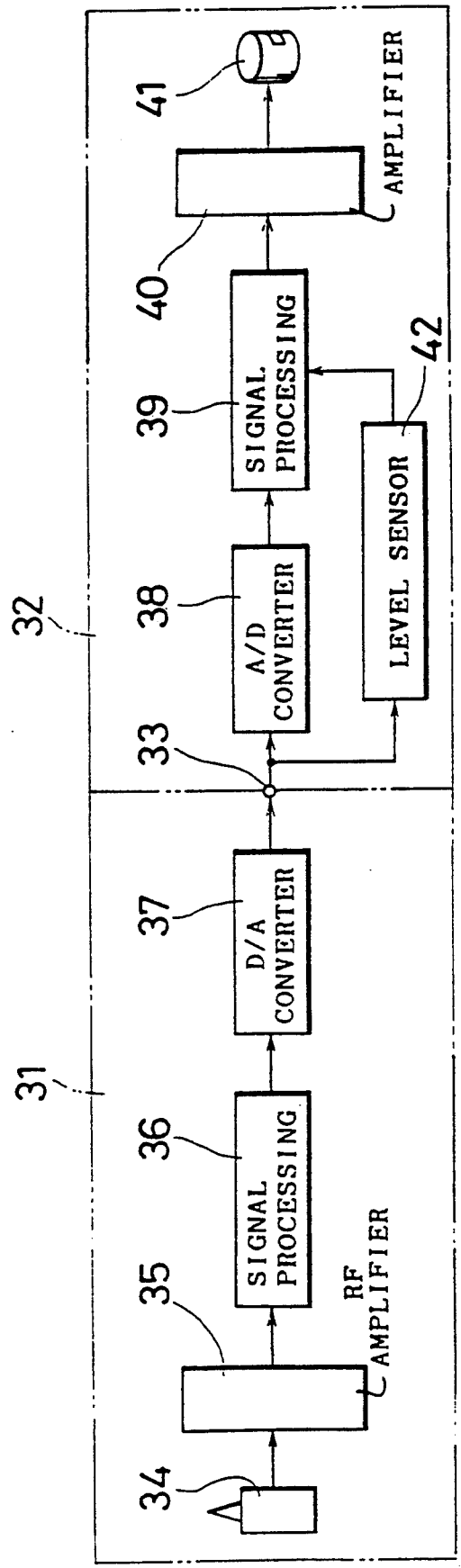
FIG.1 is a block diagram showing in outline the configuration of a prior art dubbing apparatus.
Figure 2:
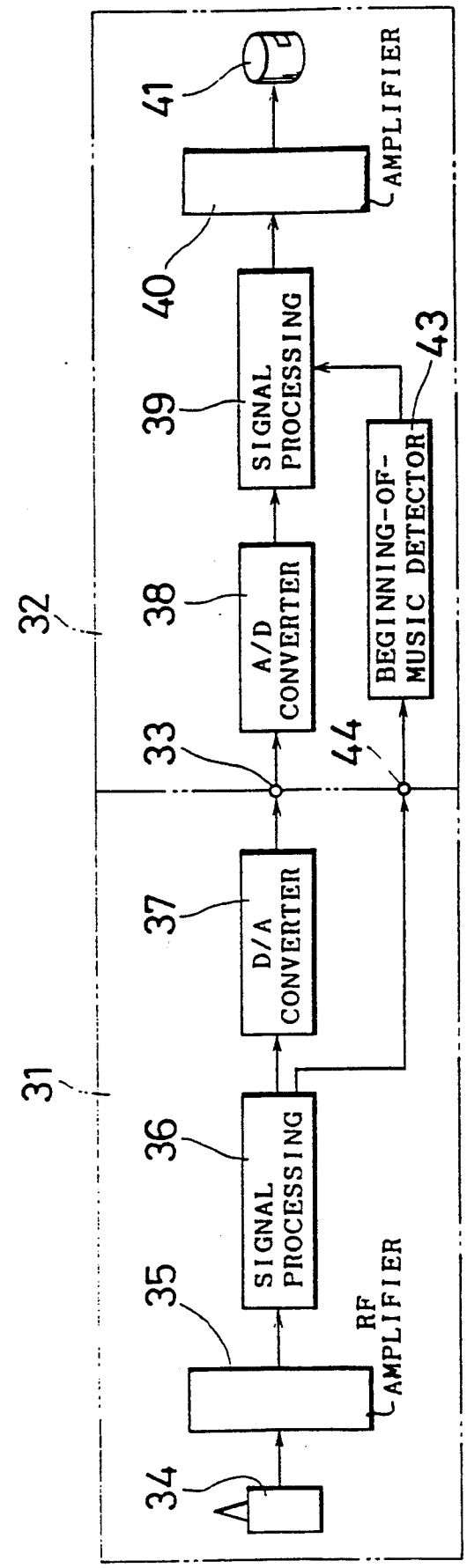
FIG.2 is a block diagram showing in outline the configuration of another prior art dubbing apparatus.

Now referring to the drawing, preferred embodiments of the invention are described below.

Figure 3A:
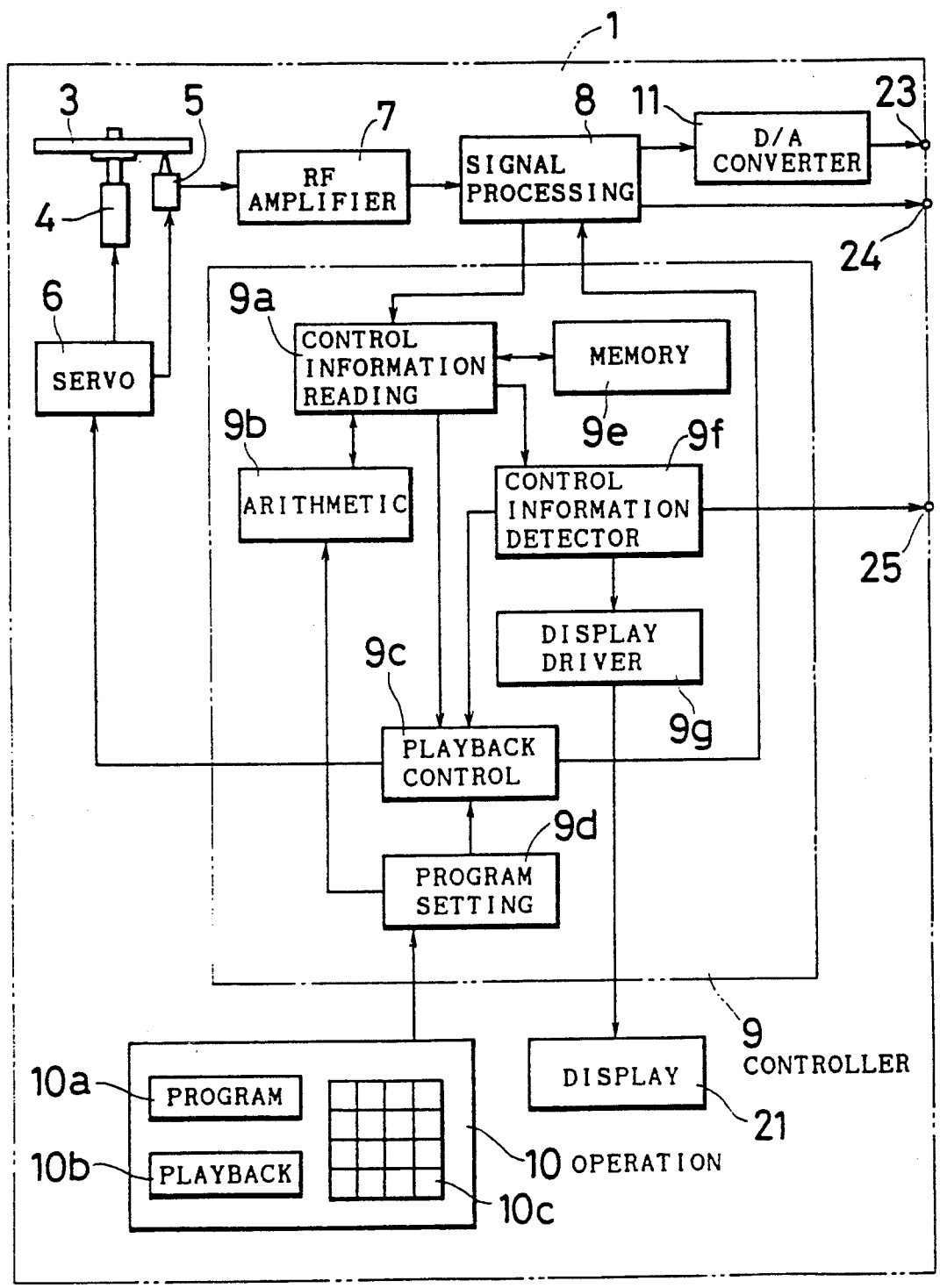
FIGS.3(a and b) is a block diagram showing the basic configuration of a recording/reproducing apparatus in one embodiment of the invention.
Figure 3B:
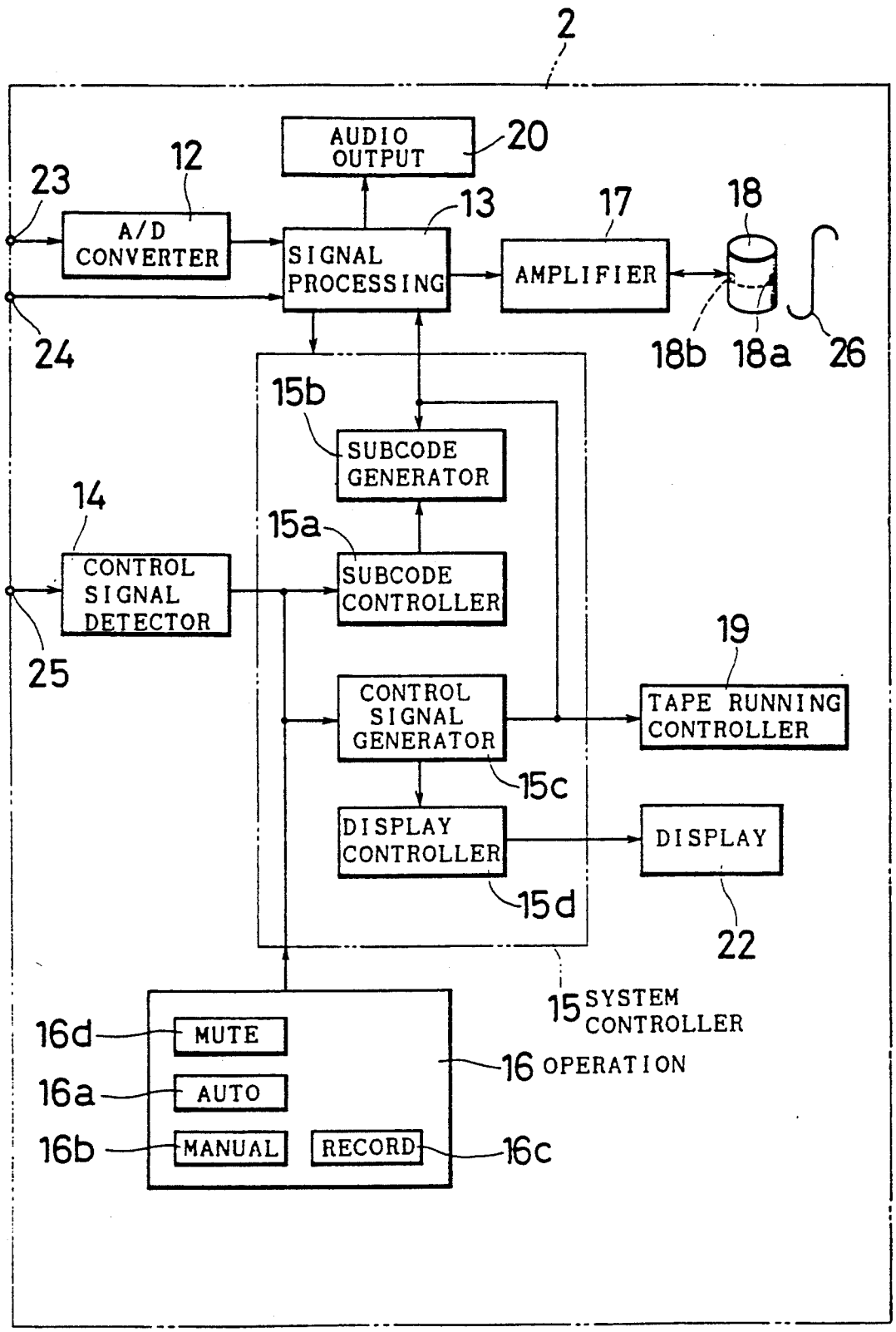

FIG.3 is a block diagram showing the basic configuration of a recording/reproducing apparatus in one embodiment of the invention. The recording/reproducing apparatus shown comprises a CD player section 1 and a digital magnetic tape recorder section 2 interconnected via terminals 23, 24, 25.

In the CD player section 1, the signal detected from a CD 3 by an optical pickup 5 is first amplified by an RF amplifier 7 and is then fed to a signal processing circuit 8 where main information such as a digital audio signal is separated from control information and demodulated. The digital audio signal is fed to a D/A converter 11 where it is converted to an analog audio signal which is output at the terminal 23, while the digital signal is also supplied directly to the terminal 24. The control information, i.e. the subcode information, is supplied to a controller 9.

The controller 9 controls a servo circuit 6 in accordance with the directive signal and subcode information supplied from a operation section 10. The servo circuit 6 drives and controls a motor 4 and the optical pickup 5 in accordance with the control signals supplied from the controller 9. Connected to the controller 9 is a display section 21 on which the playback (reproducing) states of the CD 3, such as the program number (music number) being played and the playing time, are displayed.

The controller 9 includes a control information reading circuit 9a, an arithmetic circuit 9b which is a setting means, a reproduction control circuit 9c, a program setting circuit 9d, a memory 9e, a control information detection circuit 9f which is a control signal output means, and a display driving circuit 9g, and outputs control information at the terminal 25 in accordance with the information calculated (set) from the subcode information. The operation of each circuit from 9a to 9g will be later described. The operation section 10 comprises a program keypad 10a used to set the playback sequence of music reproduced from the CD 3, a playback key 10b used to start the playback of the CD 3, and a numeric keypad 10c used to input music number, etc.

In the digital magnetic tape recorder section 2, the analog audio signal given through the terminal 23 is converted by an A/D converter 12 into a digital audio signal which is then provided to a signal processing circuit 13, while the digital audio signal given through the terminal 24 is directly provided to the signal processing circuit 13.

While the digital audio signal is converted into audible sound through an audio output circuit 20, the signal processing circuit 13 performs signal processing such as demodulation and the addition of subcode information and the thus processed digital audio signal is then amplified by an amplifier 17 for recording on a magnetic tape 26 by means of magnetic heads 18a, 18b mounted on the outer circumferential surface of a rotating drum 18. The subcode information is supplied from a system control circuit 15.

The system control circuit 15 includes a subcode controller 15a and a subcode generating circuit 15b which are control information recording means, a control signal generating circuit 15c which is a recording control means, and a display control circuit 15d. The operation of each circuit will be later described.

The system control circuit 15 controls a magnetic tape running control circuit 19 in accordance with the control signals supplied from an operation section 16 and a control signal detection circuit 14 which is a control signal detecting means. The operation section 16 comprises an auto key 16a, a manual key 16b, a record key 16c, a mute key 16d, etc.

The control signal detection circuit 14 detects the control information applied through the terminal 25 and supplies the detected control information to the system control circuit 15. Also connected to the system control circuit 15 is a display section 22 on which the recording states of the magnetic tape 26 in the digital magnetic tape recorder section 2, such as the current program music number, recording time, etc., are displayed.

FIG.4 shows the format of Q channel data which is among the subcodes of the CD 3. FIG.4(1) shows the data format of the lead-in track of the CD 3, the lead-in track also being referred to as the TOC (Table of Contents) area.

The first 8-bit code TNO indicates the track number (music number) which is "00" for the lead-in track. The next 8-bit code POINT indicates the kind of information and designates the display contents such as the track number, total time, etc. The next 24-bit code indicates the running time in the lead-in area, the code MIN indicating the minutes, the code SEC the seconds, and the code FRAME the frames. Here, one second corresponds to 75 frames.

The next code ZERO indicates data separation and is always "zero". The last 24-bit code indicates the start position of the track number designated by the code TNO; i.e. the code PMIN indicates the minutes, the code PSEC the seconds, and the code PFRAME the frames. The lead-in track contains such data sets the number of which is equal to the number of music pieces (programs) recorded on the CD 3, thus constituting the contents of the CD 3.

FIG.4 (2) shows the data format of Q channel data in the program area where main information, i.e. music, is recorded. The first 8-bit code TNO indicates the track number (music number); if it is "AA", it indicates the lead-out track. The next 8-bit code INDEX indicates the index of the track number and is used when subdividing the program into a plurality of segments. For example, "00" indicates the quiet portion at the beginning of music, and "01" indicates the actual start position. The next 24-bit code indicates the elapsed time (playing time) within the program, the code MIN indicating the minutes, the code SEC the seconds, and the code FRAME the frames.

The next 8-bit code ZERO indicates data separation and is always "zero". The last 24-bit code indicates the total playing time of the CD 3, the code AMIN indicating the minutes, the code ASEC the seconds, and the code AFRAME the frames.

Therefore, the minutes, seconds, and frames of each track are counted for time display starting from the beginning (top) of music at which the index is "01", while the total time is counted for time display starting from the track whose code TNO is "01" and code INDEX is "00".

The Q channel data includes, in addition to the above codes, an address code, a control code, a check code, etc.

Figure 5A:
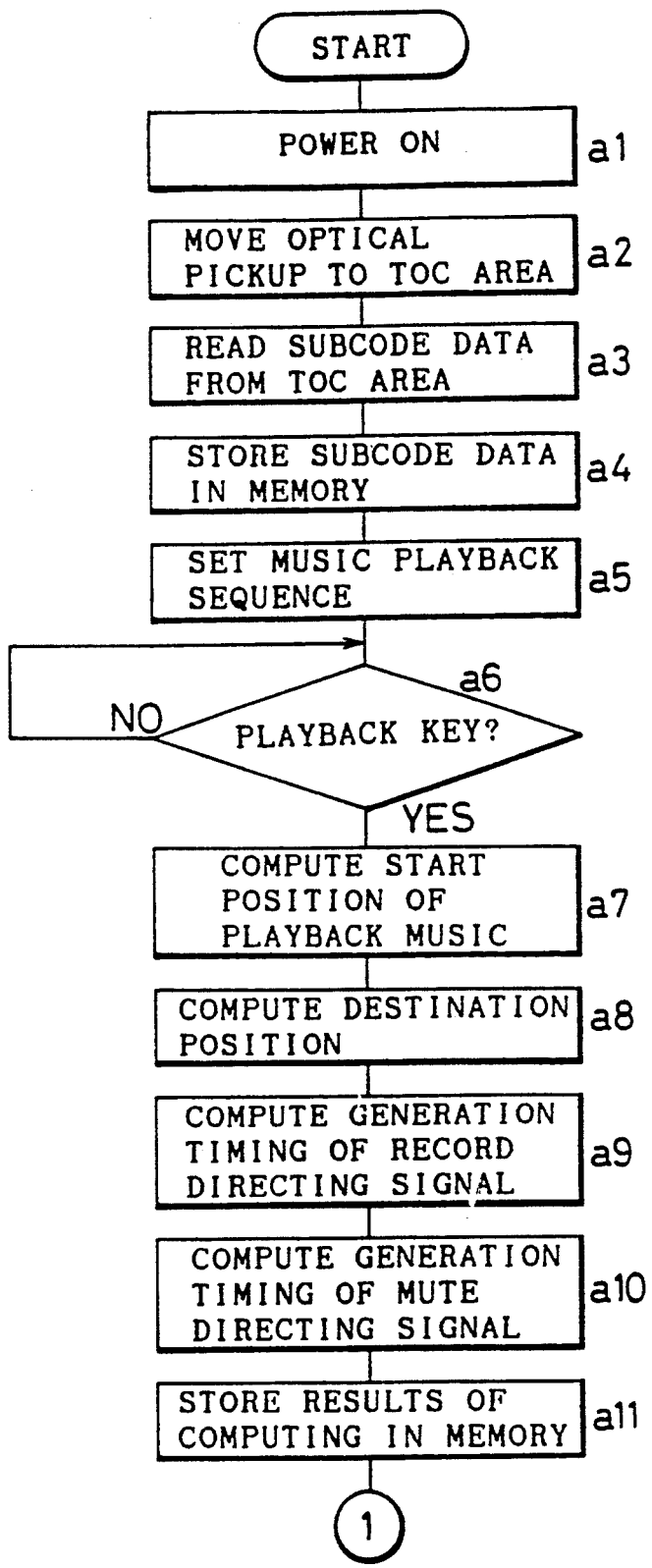
FIGS.5(a and b) is a flowchart explaining the reproducing operation of a CD player section 1.
Figure 5B:
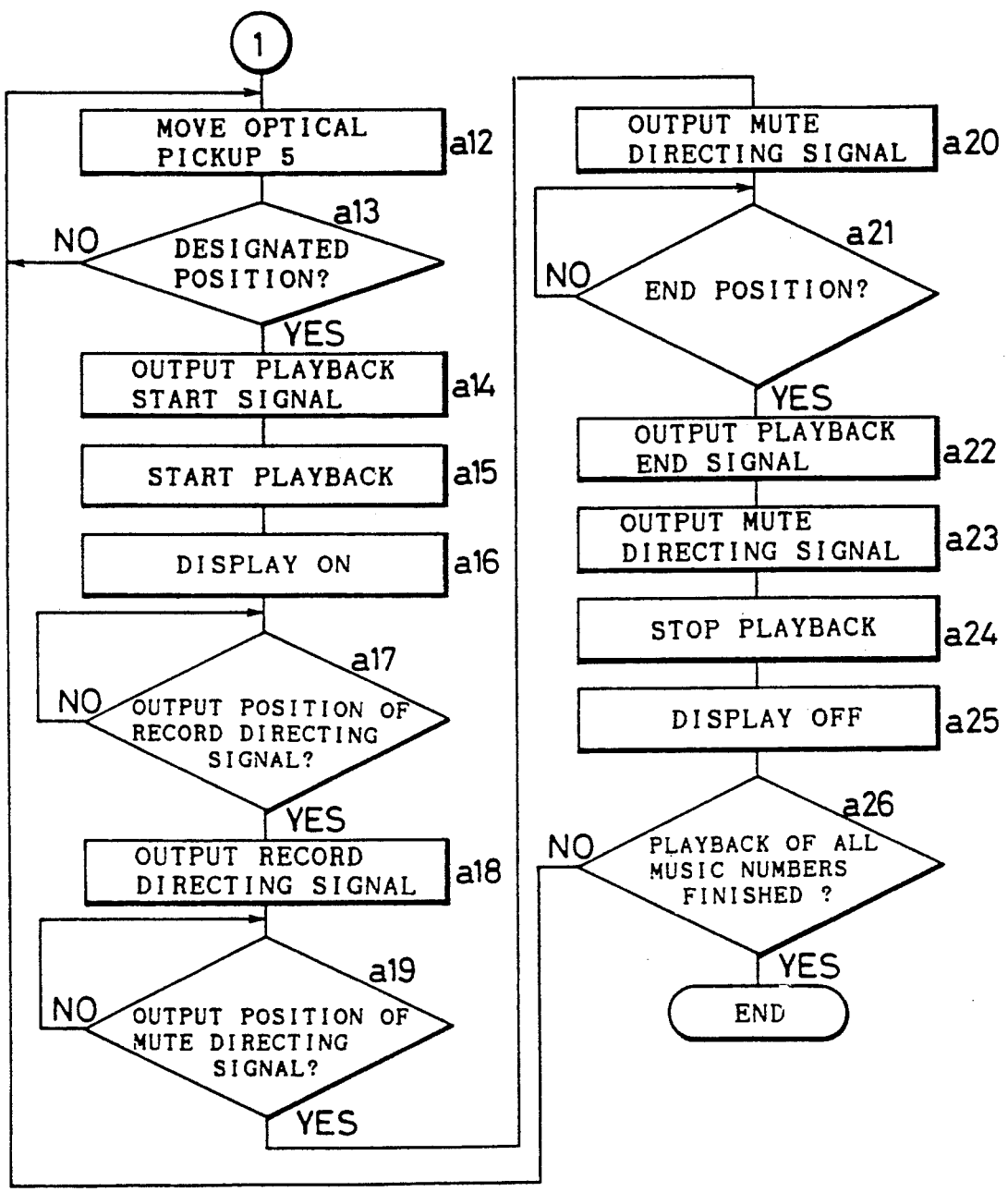
Figure 6:
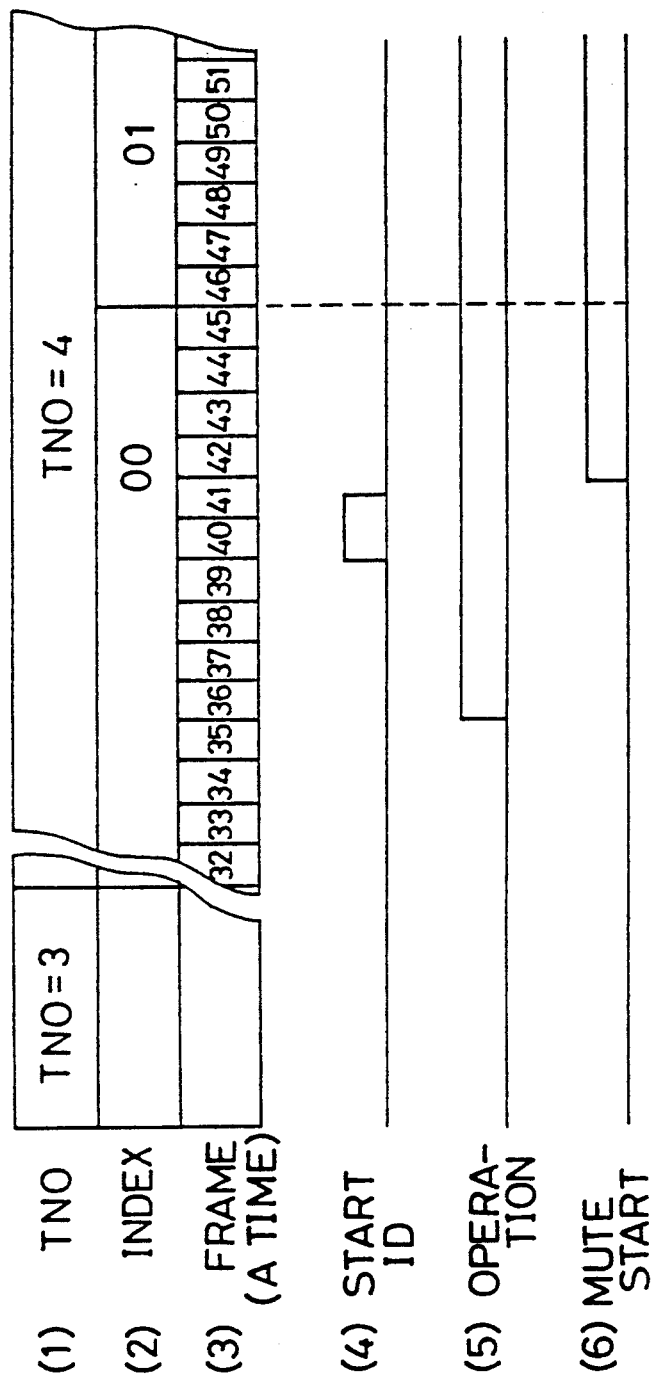
FIG.6 is a timing chart explaining the reproducing operation of the CD player section 1.
Figure 7:
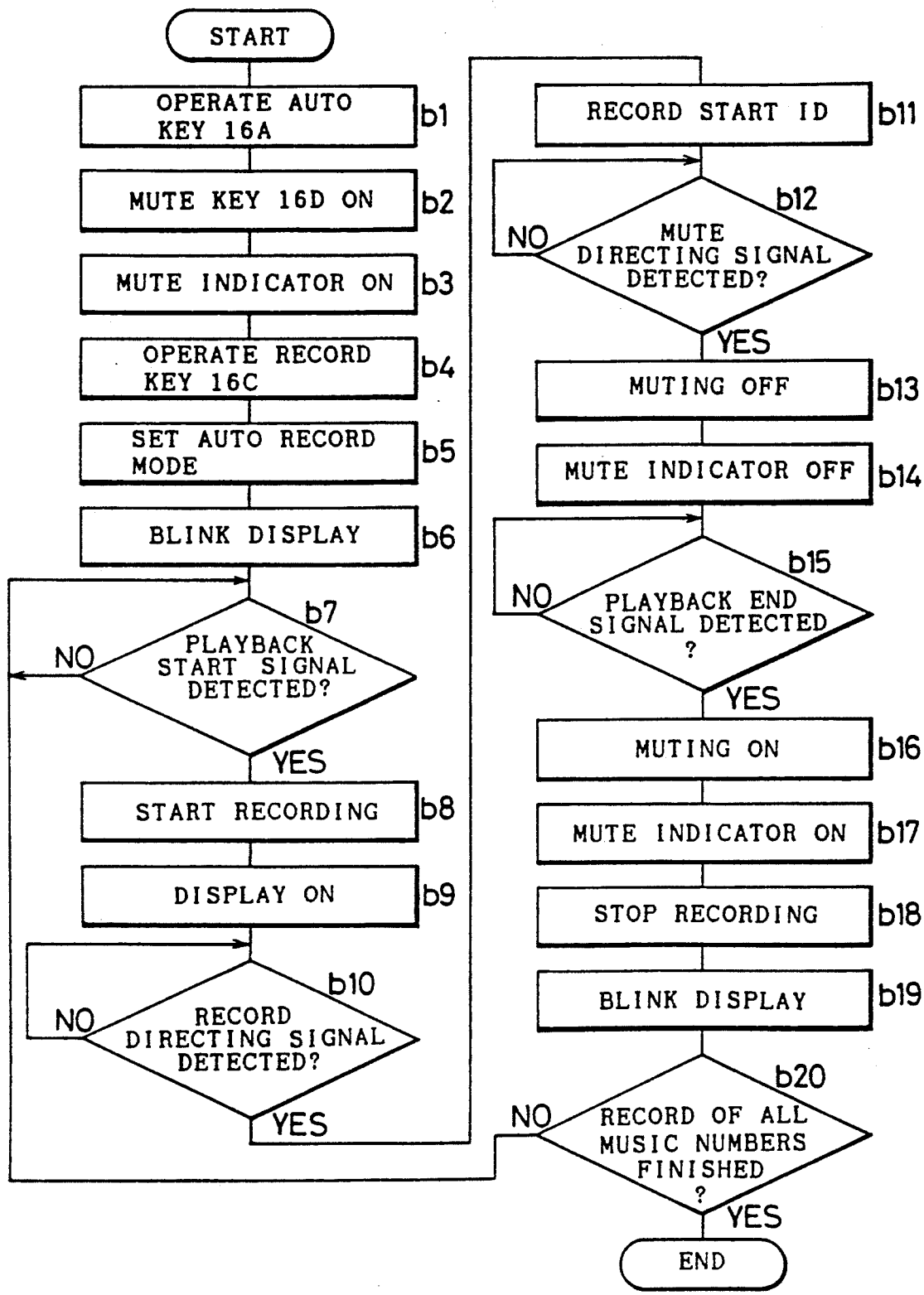
FIG.7 is a flowchart explaining the recording operation of a digital magnetic tape recorder section 2.

FIG.5 is a flowchart explaining the reproducing operation of the CD player section 1, and FIG.6 is a diagram illustrating the data format of the CD 3 and the generation timing of various operation directing signals. FIGS.6(1). 6(2), and 6(3) indicate the Q channel data code TNO. INDEX, and FRAME respectively, while FIGS.6(4), 6(5), and 6(6) illustrate the generation timing of a start ID record directing signal, a playback directing signal, and a mute directing signal, respectively.

Referring to FIGS.5 and 6, the reproducing operation of the CD player section 1 will now be described. When power is turned on or the CD 3 is loaded into the CD player in step a1, the optical pickup 5 is moved to the TOC area in step a2.

In step a3, out of the Q channel data, the track number, the minutes, seconds, and frames indicating the beginning of music, the final track number, the total time, etc. are read by the control information reading circuit 9a in accordance with the format shown in FIG.4(1). In step a4, each data indicating the beginning of music read by the control information reading means 9a is stored in the memory 9e.

In step a5, the operator operates the numeric keypad 10c, the program keypad 10a, etc. on the operation section 10 in the CD player section 1, to set the playback sequence of music. Thereafter, when the playback key 10b is operated in step a6, the process proceeds to step a7.

In step a7, in accordance with the music playback sequence set by the program setting circuit 9d and the Q channel data stored in the memory 9e, the arithmetic circuit 9b computes the time (minutes, seconds, frames) indicating the start position of the first music to be replayed.

In step a8, computation is made to determine the destination position of the optical pickup 5, i.e. the position on the CD 3 to which the optical pickup 5 should be quickly moved over. In this embodiment, the reproducing operation is started 10 frames before the start position of the replay music; therefore, to playback the fourth music, for example, the destination position (code TNO, code INDEX, code FRAME) is computed as (4, 00, 36). so that the optical pickup 5 is quickly moved to the thus computed destination position. One method is to set the start time (minutes, seconds, frames) of the destination music in terms of the total time and directly locate the position. Another method is to first set the music number only and then locate the position where the playing time of the music shows "00 minutes 00 seconds" and the predetermined number of frames after a search is made for the music position.

In step a9, the generation timing of the record directing signal that directs the recording of the start ID on the magnetic tape 26 is calculated. In this embodiment, the record directing signal is generated six frames before the start position of the replay music: therefore, to playback the forth music, for example, (code TNO, code INDEX, code FRAME)=(4, 00, 40) is calculated as the generation timing of the record directing signal.

In step a10, the generation timing of the mute directing signal is calculated. In this embodiment, the mute directing signal is generated four frames before the start position of the playback music; therefore, (code TNO, code INDEX, code FRAME)=(4, 00, 42) is calculated as the generation timing of the mute directing signal.

In step a11, the start position of the playback music, the destination position, the generation timing of the record directing signal, and the generation timing of the mute directing signal, respectively calculated in steps a7, a8, a9, a10, are stored in the memory 9e.

In step a12, the optical pickup 5 is moved under the control of the reproduction control circuit 9c while reading the Q channel data the format of which is shown in FIG.4(2). In step a13, it is determined whether the designated position, i.e. the destination position calculated in step a8, has been detected by the control information detection circuit 9f. When the designated position has been detected, the process proceeds to step a14.

In step a14, a playback start directing signal is output from the control information detection circuit 9f. In step a15, in response to the playback start directing signal, the reproduction control circuit 9c controls the servo circuit 6 to start the reproduction of the CD 3. The playback start directing signal is also fed via the terminal 25 to the control signal detection circuit 14 in the digital magnetic tape recorder section 2. In the digital magnetic tape recorder section 2, the recording operation to be described later is initiated in response to this playback start directing signal.

In step a16, display is produced on the display section 21 by the display driving circuit 9g in response to the playback start directing signal. The display on the display section 21 is only required to tell the operator that the CD player section 1 is in reproducing operation; therefore, an indicator such as a light emitting diode may be used, or alternatively, the characters "PLAYBACK" may be displayed.

When the generating point of the start ID record directing signal is detected by the control information detection circuit 9f in step a17, the record directing signal is output in step a18. The record directing signal is fed via the terminal 25 to the control signal detection circuit 14 in the digital magnetic tape recorder section 2. In the digital magnetic tape recorder, section 2, when this record directing signal is detected, the start ID is recorded on the magnetic tape 26.

When the generating point of the mute directing signal is detected by the control information detection circuit 9f in step a19, the mute directing signal is output in step a20. The mute directing signal is fed via the terminal 25 to the control signal detection circuit 14 in the digital magnetic tape recorder section 2. In the digital magnetic tape recorder section 2, the mute operation is turned off in accordance with the mute directing signal.

When the end position of the playback music, i.e. the position where the Q channel data code TNO changes, is detected in step a21, the control information detection circuit 9f outputs a playback end signal in step a22 and a mute directing signal in step a23. The playback end signal is fed via the terminal 25 to the control signal detection circuit 14 in the CD player section 1. In step a24, the reproducing operation of the CD player section 1 stops. In response to the playback end signal, the digital magnetic tape recorder section 2 turns on the muting and stops the recording operation.

Stopping the tape running operation may be effected by issuing a stop signal when a prescribed time has elapsed after the playback end signal; alternatively, the tape running operation may be stopped when a prescribed time has elapsed after detection in the digital magnetic tape recorder section 2 of the playback end signal from the CD player section 1.

In step a25, the display driving circuit 9g turns off the display on the display section 21 in response to the playback end signal. This means turning off the illuminating indicator or the character display of "PLAYBACK".

The above description has dealt with the reproducing operation in accordance with the playback sequence as set by program selection, starting with the fourth music, for example. It will be appreciated that even when playing back music in the sequence as recorded on the CD 3, i.e. starting with the first music, the calculation of the time (position) of the start position of the first music, the calculation of the generating point of each control signal, and the steps of detecting these signals are performed in the same manner as described above. However, when recording music in the sequence as recorded on the CD 3, since the intermusic space becomes the shortest and it is therefore not necessary to quickly move to the start position of the designated music, it may be so configured not to output the control signals such as the playback end signal, playback start directing signal, mute directing signal, etc. between one music and the next.

Thereafter, in step a26, it is determined whether all of the preset music numbers have been played back. When playing back all the music numbers has been finished, the process is terminated. When not, the optical pickup 5 is moved to the playback start position of the next recorded music, as shown in FIG.5, to repeat the reproducing operation.

FIG.6 is a flowchart illustrating the recording operation of the digital magnetic tape recorder section 2. When the operator operates the auto key 16a in step b1, the setting is made so that the start ID will be automatically recorded; when the mute key 16d is operated in step b2, a mute indicator is turned on in step b3; and when the record key 16c is operated in step b4, the digital magnetic tape recorder section 2 is set in auto record mode in step b5.

In step b6, the display control circuit 15d is activated so as to blink the display on the display section 22. For example, an indicator indicating the record mode or a character display "RECORD" may be made to blink.

In step b7, it is determined whether the playback start directing signal has been detected by the control signal detection circuit 14. When the playback start directing signal is detected, the control signal generating circuit 15c outputs a record start directing signal in step b8, thereby initiating the operation for recording on the magnetic tape in the digital magnetic tape recorder section 2.

In step b9, the display control circuit 15d is activated so that the display on the display section 22 stays lit. For example, the indicator indicating the record mode or the character display "RECORD" may be made to stay lit.

Therefore, when the CD player section 1 is placed in the playback mode, the display section 21 in the CD player section 1 produces a display indicating the CD player is in the reproducing operation, and at the same time, the digital magnetic tape recorder section 2 is put in the record mode, with the display section 22 in the digital magnetic tape recorder section 2 producing a display indicating the digital magnetic tape recorder section is in the record operation.

When the control signal detection circuit 14 detects the start ID record directing signal in step b10, the subcode controller 15a controls the subcode generating circuit 15b to output a start ID recording signal in step b11. As a result, the start ID is recorded over a predetermined period on a prescribed position on the magnetic tape 26.

Thereafter, when the mute directing signal is detected by the control signal detection circuit 14 in step b12, the control signal generating circuit 15c turns off the muting in step b13 and the mute indicator in step b14.

More specifically, the digital audio signal fed to the signal processing circuit 13 is output as audible sound through the audio output circuit 20, while at the same time, the audio signal to be recorded is muted off and the display control circuit 15d is controlled so as to turn off the mute indicator on the display section 22. Thus, the audio signal from the CD player, section 1 is processed through the signal processing circuit 13, amplified by the amplifier 17, and recorded on the magnetic tape 26 by means of the magnetic heads 18a and 18b.

When the playback end signal is detected by the control signal detection circuit 14 in step b15, the control signal generating circuit 15c turns on the muting on the input audio signal in step b16 in response to the mute directing signal, and also turns on the mute indicator in step b17.

Further, in step b18, the tape running control circuit 19 is controlled to stop the recording operation, and in step b19, the record display is made to blink. That is, when the CD player section 1 finishes the reproducing operation, the "PLAYBACK" display on the display section 21 in the CD player section 1 is made to blink or goes off, while in the digital magnetic tape recorder section 2, the "RECORD" display is made to blink or goes off, with the mute indicator coming on.

In step b20, it is determined whether all of the selected music numbers have been recorded. When the recording is finished, the process is terminated, and when the recording is not finished, the process returns to step b5 to initiate the recording operation for the next selected music number.

As described, according to the present embodiment, when dubbing of music is performed from the CD 3 to the recording tape 26, the start ID is inserted and recorded precisely at a position immediately before the start position of each music: therefore, when playing back the music using the start ID, a sound dropout in the beginning part of the music can be prevented. Furthermore, when dubbing music being played back by program selection, an appropriate space can be inserted in recording between one music and the next: since muting is turned on during the intermusic space, the generation and recording of unusual noises can be prevented. Moreover, since the playback and record indicators are displayed on the display sections 21 and 22 respectively, the operator can easily check the operating states of the CD player section 1 and the digital magnetic tape recorder section 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A reproducing system for reproducing information from a first recording medium and providing the reproduced information to a recording apparatus for storage on a second recording medium, the first recording medium storing in a first sequence recorded blocks of main program information, each block being preceded by sub-code control information that includes address information designating a block start position, comprising:

means for inputting a second sequence for selectively playing back recorded blocks of main program information from the first recording medium different from the first sequence for recording onto the second recording medium;

means for calculating a playback position corresponding to a selected block of main program information based on the second sequence and the start position of the selected block;

means for determining a destination position a predetermined distance before the playback position;

means for determining a start identification position between the playback position and the destination position;

means for moving a playback device to the destination position on the first recording medium and commencing reproduction of the selected block of main program information;

means for detecting when the playback device reaches the start identification position on the first recording medium and recording a start identification signal corresponding to the selected block on the second recording medium before recording any main program information of the selected block;

means for detecting when the playback device reaches the playback position on the first recording medium and recording the selected block of main program information onto the second recording medium.

2. The system according to claim 1, further comprising:
means for detecting an end of the selected block main program information, stopping playback of the recorded information, and activating a mute signal.

3. The system according to claim 2, further comprising:
means for computing a mute deactivation position between the start identification position and the playback position.

4. The system according to claim 3, further comprising:
means for detecting the mute deactivation position for deactivating the mute signal to permit recording of the selected block main program information onto the second recording medium.

5. The system according to claim 1, further comprising:
means for displaying a playback signal when the playback position is detected.

6. The system according to claim 5, further comprising:
means for deactivating display of the playback signal when an end of the first block is detected.

7. The system according to claim 1, wherein the first recording medium is divided into frames and the destination position is 10 frames before the playback position and the start identification position is 7 frames before the playback position.

8. The system according to claim 3, wherein the muting deactivation signal is five frames before the playback position.

9. The system according to claim 1, wherein the subcode information includes track number, frame, running time, and start position for each block.

10. The system according to claim 1, wherein the first recording medium is optical disk and the second recording medium is magnetic tape.

* * * * *